J. Emery.
Lamp-Shade.

No 3016 Reissued Jun. 30, 1868.

Witnesses.
Samuel N. Piper
Geo. H. Andrews

James. Emery
by his attorney
R. H. Eddy

United States Patent Office.

JAMES EMERY, OF BUCKSPORT, MAINE,

*Letters Patent No.* 66,576, *dated July* 9, 1867; *reissue No.* 3,016, *dated June* 30, 1868.

IMPROVEMENT IN LAMP-SHADES.

The Schedule referred to in these Letters Patent and making part of the same.

TO ALL PERSONS TO WHOM THESE PRESENTS SHALL COME:

Be it known that I, JAMES EMERY, of Bucksport, in the county of Hancock, State of Maine, have invented a new and useful or improved Lamp-Shade; and do hereby declare the same to be fully described in the following specification, reference being had to the accompanying drawings, and the letters of reference marked thereon.

The nature of my invention consists in so constructing a lamp-shade, formed of a metal shade-bearer, combined with a shade made of pasteboard or other suitable material, that it may be conveniently attached to and detached from the upper end of the lamp-chimney, a portion of the metal shade-bearer being made to rest against the side of lamp-chimney, which serves as a fulcrum on which to support the shade in an inclined position.

Figure 1:
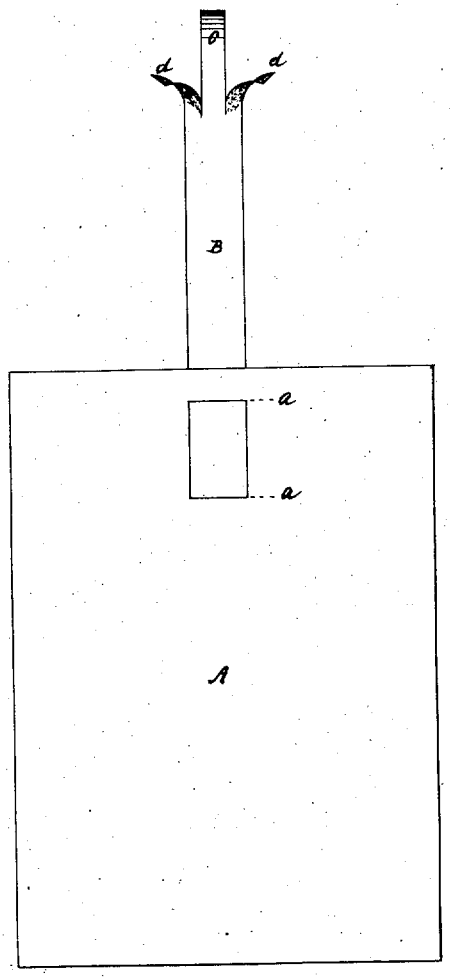
Figure 1 is a front view.
Figure 2:
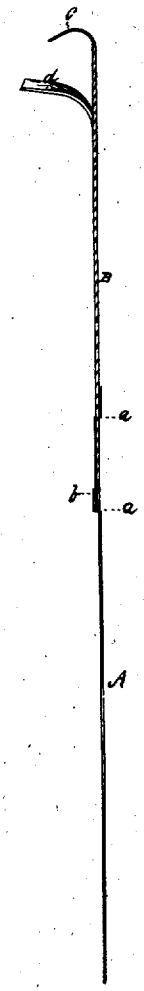
Figure 2 is a longitudinal section.
Figure 3:
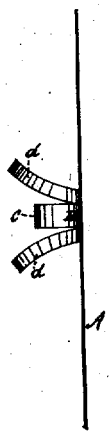
Figure 3 is a top view of the same.

In such drawings, A denotes a screen, made of pasteboard or other suitable material, of a rectangular or other suitable shape. It is represented in the drawing as provided with two slits, *a a*, made through it, to receive the metal carrier B. I regard this as the best manner of attaching the screen A to the carrier B, as this admits of a vertical adjustment of the former upon the latter. But, if desired, the screen may be attached firmly to the carrier by riveting the same together, or in any other manner, at the option of the manufacturer.

In the drawings, the carrier B is represented as being formed of a thin strip of metal, trifurcated at its upper end, (*d d e*,) and bent or doubled back upon itself at its lower end, as shown at *b*, which serves to limit the downward motion of the screen. The middle one of the three prongs is represented as bent in the form of a hook, and each of the other prongs as bent with respect to the rest of the carrier, as shown in the drawings. This is a cheap and convenient mode of constructing the screen-bearer; but it may be made, if desired, of wire or metal, in any other form, and instead of slitting the upper end into three prongs, it may be divided into two or any other number of parts, when made of flat metal, or, when made of wire, the wire may be bent in the form of a hook, or otherwise, at the upper end, so that it can be conveniently attached to and detached from the chimney of the lamp, and the body of the carrier may then have prongs attached to it, or it may itself be bent, so as to rest against the side of the lamp-chimney, which will thus be made to serve as a fulcrum on which to support the shade in an inclined position.

In using the shade, the upper end of the carrier is hooked upon or otherwise attached to the upper end of the lamp-chimney, and the prongs, or that part of the body of the carrier designed for the purpose, rest against the outer surface of the chimney, so as to support the shade in an inclined position. The screen may be made plain, or it may be ornamented at pleasure.

I claim as a new manufacture—

A lamp-shade, made of a screen, A, and a carrier, B, designed to be attached, by its upper end, to the chimney of a lamp, with a portion of its body formed to rest against the side of the chimney, which thus serves as a fulcrum on which to support the shade in an inclined position, constructed and applied together, substantially as specified.

JAS. EMERY.

Witnesses:

J. W. STOVER,

A. F. PAGE.